(12) United States Patent
Chen et al.

(10) Patent No.: US 8,928,824 B2
(45) Date of Patent: Jan. 6, 2015

(54) LIQUID CRYSTAL LENS UNIT AND STEREOSCOPIC DISPLAY

(71) Applicants: Chih-Wen Chen, Guangdong (CN); Chia-Chiang Hsiao, Guangdong (CN)

(72) Inventors: Chih-Wen Chen, Guangdong (CN); Chia-Chiang Hsiao, Guangdong (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 175 days.

(21) Appl. No.: 13/703,416

(22) PCT Filed: Nov. 16, 2012

(86) PCT No.: PCT/CN2012/084760
§ 371 (c)(1),
(2) Date: Dec. 11, 2012

(87) PCT Pub. No.: WO2014/075297
PCT Pub. Date: May 22, 2014

(65) Prior Publication Data
US 2014/0132862 A1   May 15, 2014

(30) Foreign Application Priority Data
Nov. 15, 2012   (CN) .......................... 2012 1 0460290

(51) Int. Cl.
*G02F 1/1335* (2006.01)
*G02F 1/29* (2006.01)
*G02B 27/22* (2006.01)
*G02F 1/13363* (2006.01)

(52) U.S. Cl.
CPC .............. *G02F 1/29* (2013.01); *G02B 27/2214* (2013.01); *G02F 2001/133638* (2013.01); *G02F 2001/294* (2013.01)

USPC .............................. 349/15; 349/96; 349/117

(58) Field of Classification Search
CPC .............. G02F 1/1313; G02F 1/12204; G02F 1/133528; G02F 1/133536; G02F 1/3363; G02F 1/133634; G02B 27/26; G02B 27/2215; G02B 5/303; G02B 5/3083; H04N 13/0404; H04N 13/0434; H04N 13/0409
USPC ............................................. 349/15, 96, 117
See application file for complete search history.

(56) References Cited

U.S. PATENT DOCUMENTS 8,582,043 B2 * 11/2013 He et al. ......................... 349/15
2008/0211736 A1 * 9/2008 Taira et al. ....................... 345/6
(Continued)

FOREIGN PATENT DOCUMENTS

CN          1525243 A      9/2004
CN        101303456 A     11/2008
(Continued)

*Primary Examiner* — Mike Qi
(74) *Attorney, Agent, or Firm* — Kirton McConkie; Evan R. Witt

(57) ABSTRACT

A polarizer film is used for converting polarized light from a backlight module into light along a first direction. Multiple electrodes are disposed on a transparent substrate. Each electrode extends along a second direction different from the first direction. An alignment of liquid crystal molecules varies according to voltage applied on the electrodes. A retard unit is disposed between the transparent substrate and the polarizer film and used for converting the polarized light into light along a third direction different from the first and second direction. A polarization direction of the emitted light is perpendicular to an alignment of an electrode layer. In this way, an optical axis of the liquid crystal molecules matches the polarization direction of the light from the retard unit when voltage is not applied. So, the maximal lens power is attained with decreasing the cost resulted from the decreased thickness of the liquid crystal layer.

8 Claims, 5 Drawing Sheets

(56) References Cited

U.S. PATENT DOCUMENTS

| | | |
|---|---|---|
| 2008/0278639 A1 | 11/2008 | Hamagishi |
| 2009/0109154 A1 | 4/2009 | Hong et al. |
| 2009/0190048 A1* | 7/2009 | Hong et al. ............ 349/15 |
| 2010/0238277 A1* | 9/2010 | Takahashi et al. ............ 348/59 |

FOREIGN PATENT DOCUMENTS

| | | |
|---|---|---|
| CN | 101419351 A | 4/2009 |
| CN | 101833170 A | 9/2010 |

* cited by examiner

LIQUID CRYSTAL LENS UNIT AND STEREOSCOPIC DISPLAY

BACKGROUND OF THE INVENTION

1. Field of the Invention

The present invention relates to a liquid crystal lens (LC lens) unit and a stereoscopic display using the same, and more particularly, to an LC lens unit having high lens power and a stereoscopic display using the same.

2. Description of the Prior Art

Real-world images are perceived by the human eyes, and further, so-called three-dimensional (3D) images are perceived by the human brain depending on an apparent displacement of an object viewed along two different lines of sight. Such a displacement or a spatial difference is called parallax. A so-called 3D display device, simulating human vision to form different viewing angles, is capable of conveying 3D images to the viewer. The 3D display device produces two different 2D images with parallax, one for the viewer's right eye and the other for the left eye. Afterwards, the viewer's brain perceives these two different 2D images as a 3D image.

Nowadays, there are two types of 3D display devices in general, auto-stereoscopic displays and stereoscopic displays. A user of an auto-stereoscopic display can see 3D images without wearing special type glasses. As for a user of a stereoscopic display, he/she has to wear special type glasses to see 3D images. A commonly seen auto-stereoscopic display is divided into two types: parallax barrier auto-stereoscopic displays and lenticular lenses auto-stereoscopic displays. The theorem of parallax barrier auto-stereoscopic displays lies on that a user sees parallax images through both eyes by controlling light propagation direction with an opaque parallax barrier, and the parallax images is perceived as stereoscopic view in the brain. As for lenticular lenses auto-stereoscopic displays, light propagation direction is controlled by varying the refractive index, which can be realized by different methods. One of them is to make a liquid crystal layer function as a physical lens. With the specially patterned indium tin oxide electrodes on top and bottom substrates, the unevenly distributed electric field lines are generated. The alignment of the liquid crystal molecules is thus changed to result in their different refractive indexes. Hence, the whole liquid crystal layer will behave like a lenticular lens to control the refraction direction of the incident light if a proper design is implemented.

Please refer to FIG. 1a and FIG. 1b. FIG. 1a is a schematic diagram showing a conventional GRIN lens without being applied with a voltage according to the prior art. FIG. 1b is a schematic diagram showing the conventional GRIN lens being applied with a voltage. The GRIN lens (gradient index lens) is characterized by its refractive index distribution that varies with the distance to the axis. When no voltage is applied on the GRID lens, liquid crystal molecules will align in a manner as shown in FIG. 1a. Owing to the existence of the above-mentioned indium tin oxide electrode pattern (not indicated), the liquid crystal molecules will align in another manner, as shown in FIG. 1b, when a voltage is applied on the GRIN lens. The electric field to be generated will cause the liquid crystal molecules at the center of the lens have the highest refractive index (ne), and decreases gradually from the center to both edges of the lens until the lowest refractive index (no). When light propagates into the GRIN lens, the light travels through both edges of the lens will have a highest speed because of the lowest refractive index of the liquid crystal molecules near the edges. While the light travels through the center of the lens will have a lowest speed because of the highest refractive index of the liquid crystal molecules near the center. For an incident plane wave, the wavefront is thus curved. The curved wavefront, similar to a convex lens, is what focus the light on a focus point F. The equation for focal length is derived as follows:

$$f_{GRIN} = \frac{r^2}{2d[n_{max} - n(r)]},$$

where "$f_{GRIN}$" is the focal length of the GRIN lens 10. "d" is the cell thickness. "r" is the radius of the GRIN lens 10. $n_{max}$ is the extraordinary refractive index $n_e$ of the liquid crystal molecules. "n(r)" means that refractive index is a function of r. When a design goal of 4 mm focal length is implanted, the cell thickness d must be maintained at approximately 30 μm if the refractive index difference Δn is 0.21. However, a polarization direction of the incident light to the GRIN lens 10 not match an alignment of the liquid crystal molecules within the GRIN lens 10 causes a loss of the lens power. In order to realize lens power, one choice is to increase the cell thickness, thereby increasing the cost as well. It is therefore very important to provide a stereoscopic display to improve the lens power without increasing the cost resulted from the increased cell thickness.

SUMMARY OF THE INVENTION

An object of the present invention is to provide an LC lens unit and a stereoscopic display using the same. The LC lens unit comprises a retard unit for realizing lens power. Owing to the retard unit, problems which cannot be solved in the conventional technology are solved successfully in the present invention.

According to the present invention, a stereoscopic display comprises a backlight module for generating light, a polarizer film disposed on the backlight module for converting polarized light from the backlight module into light along a first direction, a transparent substrate disposed on the polarizer film, a liquid crystal layer, and a retard unit. A plurality of electrodes are disposed on the transparent substrate. Each of the plurality of electrodes extends along a second direction, the second direction being different from the first direction. The liquid crystal layer is disposed on the transparent substrate. An alignment of liquid crystal molecules in the liquid crystal layer varies according to voltage applied on the plurality of electrodes. The retard unit disposed between the transparent substrate and the polarizer film, is used for converting the polarized light from the polarizer film into light along a third direction, the third direction being different from the first direction and the second direction.

In one aspect of the present invention, the third direction is perpendicular to the second direction.

In another aspect of the present invention, the retard unit is a half-wave retardation plate.

In still another aspect of the present invention, the electrode layer comprises a first electrode, a second electrode, and a third electrode, the second electrode is disposed between the first electrode and the third electrode, and the stereoscopic display shows 3D images when an optical axis of the liquid crystal molecules near the first electrode and the third electrode is in parallel with a direction of transmission of the light from the polarizer film and when the optical axis of the liquid crystal molecules near the second electrode is in parallel with a polarization direction of the light from the polarizer film.

In yet another aspect of the present invention, the stereoscopic display shows 2D images when the optical axis of the liquid crystal molecules near the first electrode, the second electrode, and the third electrode is in parallel with the polarization direction of the light from the polarizer film.

According to the present invention, a liquid crystal lens unit comprises a polarizer film, for converting polarized light into light along a first direction, a transparent substrate, a liquid crystal layer disposed on the transparent substrate, and a retard unit disposed between the transparent substrate and the polarizer film. A plurality of electrodes are disposed on the transparent substrate. Each of the plurality of electrodes extends along a second direction, the second direction being different from the first direction. An alignment of liquid crystal molecules in the liquid crystal layer varies according to voltage applied on the plurality of electrodes. The retard unit is used for converting the polarized light into light along a third direction, the third direction being different from the first direction and the second direction.

In one aspect of the present invention, the third direction is perpendicular to the second direction.

In another aspect of the present invention, the retard unit is a half-wave retardation plate.

In still another aspect of the present invention, the electrode layer comprises a first electrode, a second electrode, and a third electrode, the second electrode is disposed between the first electrode and the third electrode. The stereoscopic display shows 3D images when an optical axis of the liquid crystal molecules near the first electrode and the third electrode is in parallel with a direction of transmission of the light from the polarizer film and when the optical axis of the liquid crystal molecules near the second electrode is in parallel with a polarization direction of the light from the polarizer film.

In yet another aspect of the present invention, the stereoscopic display shows 2D images when the optical axis of the liquid crystal molecules near the first electrode, the second electrode, and the third electrode is in parallel with the polarization direction of the light from the polarizer film.

Contrast to the conventional technology, the LC lens unit and the stereoscopic display using the same in the present invention comprises the retard unit which is used for adjusting the emitted light. A polarization direction of the emitted light is perpendicular to an alignment of an electrode layer. In this way, an optical axis of liquid crystal molecules in a liquid crystal layer is in parallel with the polarization direction of the light emitted by the retard unit when voltage is not applied. That is, the optical axis of the liquid crystal molecules matches the polarization direction of the light emitted by the retard unit. So, the maximal lens power is attained with decreasing the cost resulted from the decreased cell thickness.

These and other features, aspects and advantages of the present disclosure will become understood with reference to the following description, appended claims and accompanying figures.

BRIEF DESCRIPTION OF THE DRAWINGS

For better understanding embodiments of the present invention, the following detailed description taken in conjunction with the accompanying drawings is provided. Apparently, the accompanying drawings are merely for some of the embodiments of the present invention. Any ordinarily skilled person in the technical field of the present invention could still obtain other accompanying drawings without use laborious invention based on the present accompanying drawings.

DETAILED DESCRIPTION OF THE PREFERRED EMBODIMENTS

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Figure 1A:
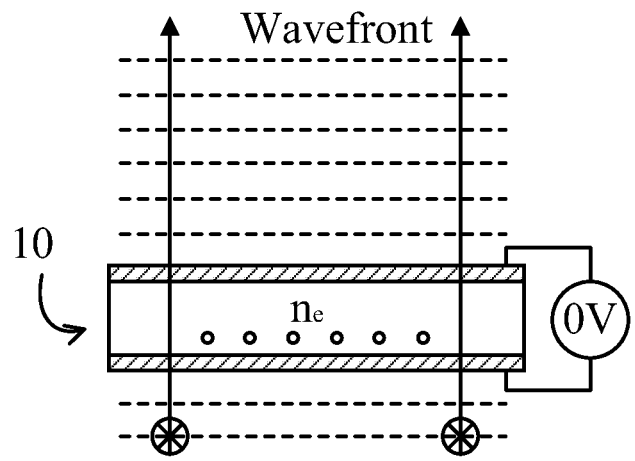
FIG. 1a is a diagram showing a conventional GRIN lens without being applied with a voltage.
Figure 1B:
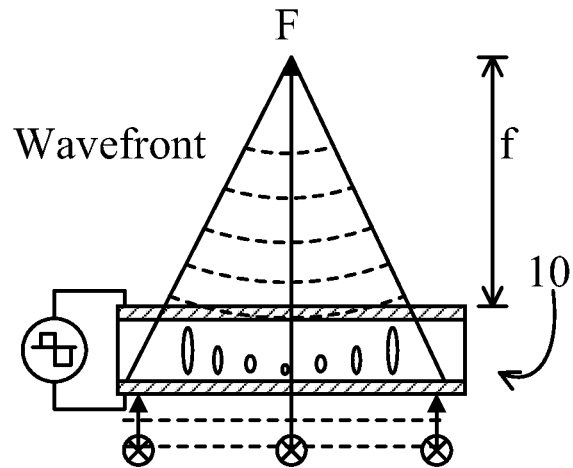
FIG. 1b is a diagram showing the conventional GRIN lens being applied with a voltage.
Figure 2:
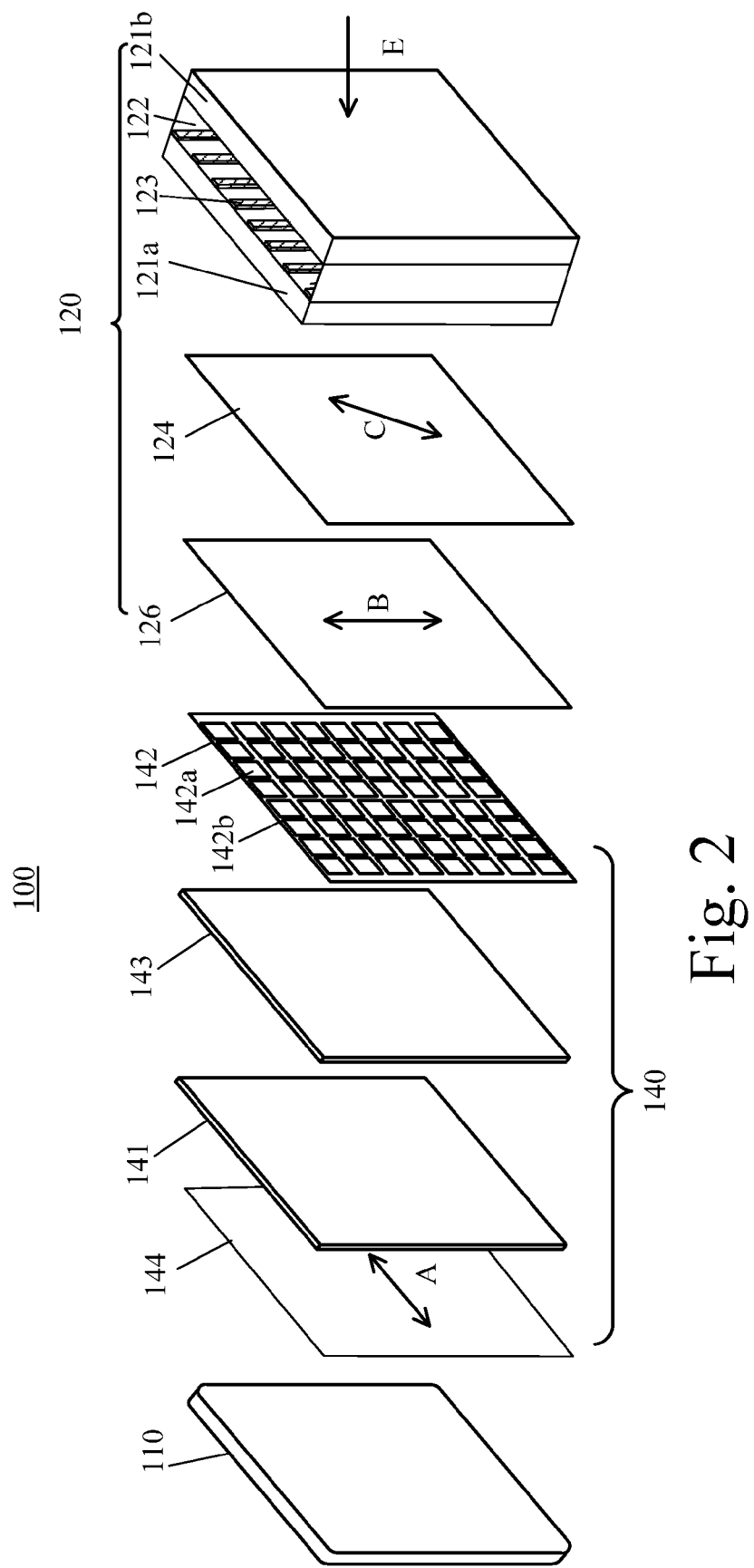
FIG. 2 is a schematic diagram showing a stereoscopic display according to the present invention.

FIG. 2 is a schematic diagram showing a stereoscopic display 100 according to the present invention. A viewer can switch between 2D and 3D modes on the stereoscopic display 100 to watch 2D and 3D images. The stereoscopic display 100 comprises a backlight module 110, a display panel 140, and an LC lens unit 120.

The backlight module 110 provides a uniform planar light source for the display panel 140. The backlight module 110 can be formed by a direct-type light emitting diode (LED), a direct-type cold cathode fluorescent lamp (CCFL), or an edge-lit LED.

The display panel 140 comprises a polarizer film 144, a pixel array 141, a color filter 142, and a liquid crystal layer 143. The polarizer film 144 comprises a plurality of pixels. The liquid crystal layer 143 is disposed between the pixel array 141 and the color filter 142. Liquid crystals in the liquid crystal layer 143 operate according to a twisted nematic (TN) mode, a vertical alignment (VA) mode, or an in-plane-switching (IPS) mode in this embodiment. The pixel array 141 comprises a plurality of subpixels. The color filter 142 comprises a filter unit 142a and a black matrix 142b. The filter unit 142a shows three primary colors, red, blue, and green. The black matrix 142b is disposed between any two adjacent filter units 142a. Each of the plurality of subpixels corresponds to a filter unit 142a. The light travels through the filter unit 142a to be extracted as the three primary colors of light, red, blue, and green. The light does not pass through the black matrix 142b. Light generated by the backlight module 110 shines on the display panel 140. An orientation of the liquid crystal molecules in the liquid crystal layer 143 which each of the plurality of subpixels corresponds to is adjusted through the driving pixel array 141 so that the light emission strength can be adjusted. Because the filter unit 142a shows the three primary colors, red, blue, and green, light with different strengths shows different grey-scales after travelling through the filter unit 142a.

The polarizer film 144 comprises a transmission axis and an absorption axis. The transmission axis and the absorption axis are perpendicular to each other. Light will transmit the polarizer film 144 if the polarization axis of light is roughly in parallel with the transmission axis. Light will be blocked by the polarizer film 144 if the absorption axis of light is roughly in parallel with the transmission axis. The transmission axis of the polarizer film 144 is in parallel with a horizontal direction A. The light from the polarizer film 144 is the linear polarized light. The polarization direction of the linear polarized light is in parallel with the horizontal direction A.

Figure 5:
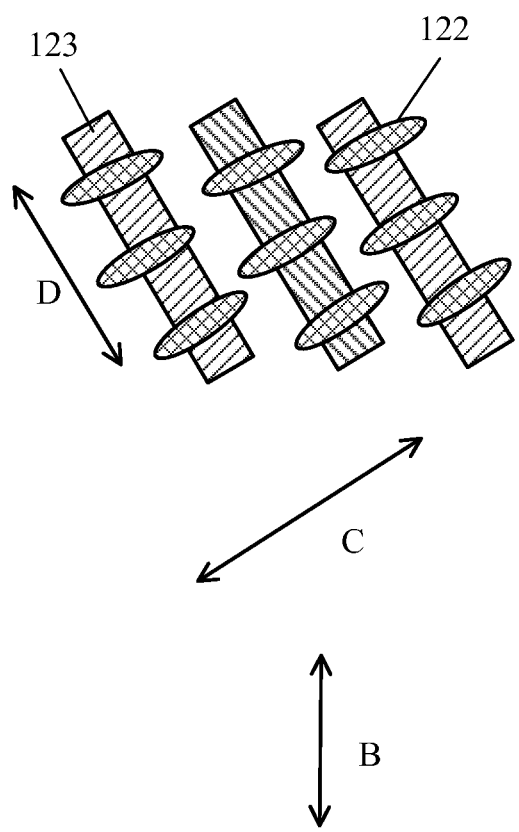
FIG. 5 shows the polarization direction of the polarizer film, the polarization direction of the retard unit, and a second direction of the electrode layer.

The LC lens unit 120 comprises a polarizer film 126, a retard unit 124, transparent glass substrates 121a and 121b, a plurality of strip-shaped electrode layers 123, and a liquid crystal layer 122. The plurality of strip-shaped electrode layers 123 are in parallel with one another and extend along a second direction D (as shown in FIG. 5). The liquid crystal layer 122 is sandwiched between the transparent glass substrates 121a and 121b. The transmission axis of the polarizer film 126 is in parallel with a first direction B in this embodiment. That is, the transmission axis of the polarizer film 126 is perpendicular to the horizontal direction A. The light from the polarizer film 126 is linear polarized light. The polarization direction of the linear polarized light is in parallel with the first direction B. In other words, the transmission axis of the polarizer film 126 forms a 90-degree angle with the transmission axis of the polarizer film 144. The electrode layer 123 is formed on the first glass substrate 121a. A direction E as shown in FIG. 2 represents the observation direction of the viewer. From the direction E, the second direction D and the first direction B form 9 to 17-degree angles. An alignment film (not shown) is disposed on the electrode layer 123. The orientation of the liquid crystal molecules is determined by the alignment film before an electric field is applied. The LC lens unit 120 can serve as a birefringence convex lens. The liquid crystal layer 122 has an ordinary refractive index "no" and an extraordinary refractive index "ne".

The retard unit 124 is disposed between the polarizer film 126 and the second glass substrate 121b. The retard unit 124 is used for converting the polarized light from the polarizer film 126 into the light along a third direction C. The third direction C is different from the first direction B and the second direction D. Preferably, the retard unit 124 is a half-wave retardation plate. The third direction C and the second direction D form a 90-degree angle.

Figure 3:
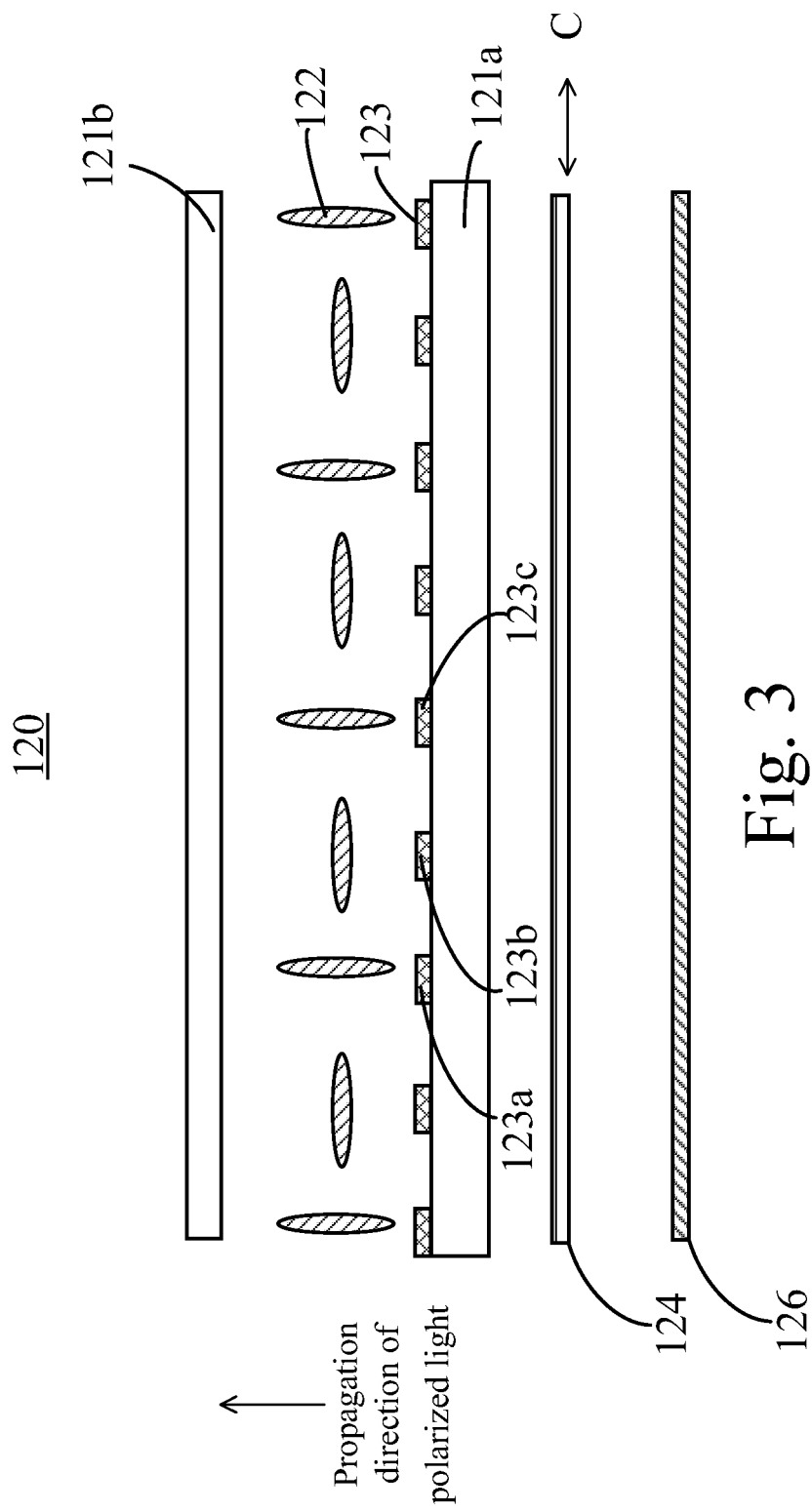
FIG. 3 shows a cross section of the LC lens unit in a 3D mode and the alignment of the liquid crystal molecules according to the present invention.

FIG. 3 shows a cross section of the LC lens unit 120 in a 3D mode and the alignment of the liquid crystal molecules according to the present invention. This embodiment is exemplified based on electrodes 123a, 123b, and 123c. Moreover, this embodiment is exemplified based on the polarization direction of the light from the polarizer film 126. The polarization direction of the light is in parallel with the first direction B. However, it is notified that the present invention is not limited to this embodiment.

The liquid crystal molecules in the liquid crystal layer 122 will rotate because of a newly generated electric field when voltage is applied on the electrodes 123a and 123c. The optical axis of the liquid crystal molecules near the electrodes 123a and 123c is in parallel with the direction of transmission of the polarized light. Voltage is not applied on the electrode 123b. The optical axis of the liquid crystal molecules near the electrode 123b is in parallel with the polarization direction of the incident light. The liquid crystal molecules in the liquid crystal layer have an optical property of birefringence. The liquid crystal molecules have an ordinary refractive index "no" when the polarization direction of the incident light to the LC lens unit 120 is perpendicular to the optical axis of the liquid crystal molecules. The liquid crystal molecules have an extraordinary refractive index "ne" when the polarization direction of the incident light to the LC lens unit 120 is in parallel with the optical axis of the liquid crystal molecules. The extraordinary refractive index ne is larger than the ordinary refractive index no.

The speed of the travelling light is the fastest when the light travels close to the electrodes 123a and 123c because the liquid crystal molecules near the electrodes 123a and 123c have the lowest refractive index. On the contrary, the speed of the travelling light is the slowest when the light travels close to the electrode 123b because the liquid crystal molecules near the electrode 123b have the highest refractive index. The variation in the alignment of the liquid crystal molecules alters the overall refractive index in the appropriate design. The LC lens unit 120, like a convex lens, determines the refraction of the incident light. The right and left eyes will receive beams of light from different directions after the incident light is refracted by the LC lens unit 120. By this method, the viewer's right eye can receive right-eye images, and the viewer's left eye can receive left-eye images. In this way, the human brain can perceive different images received by the right and left eyes as 3D images.

Figure 4:
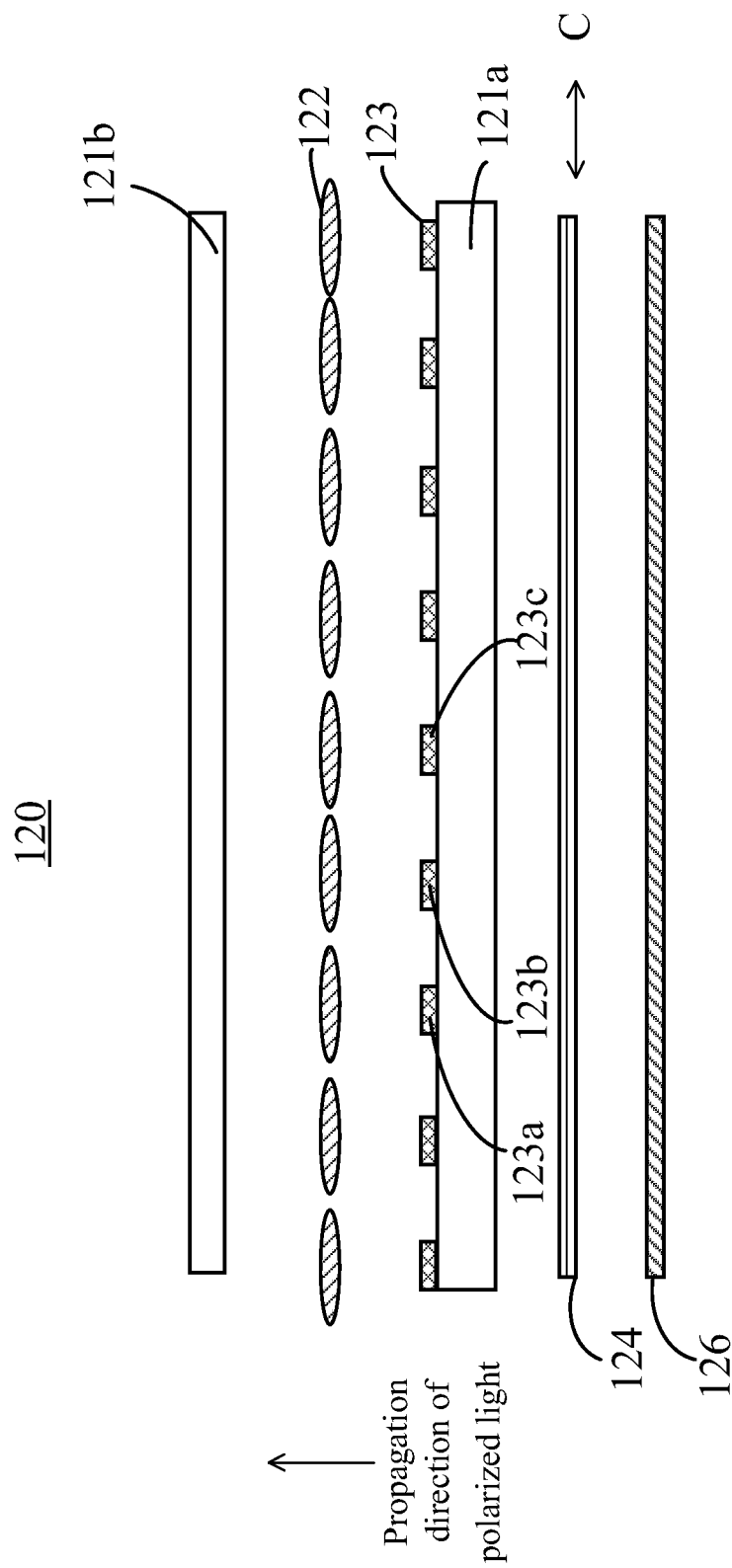
FIG. 4 shows a cross section of the LC lens unit in the 2D mode and the alignment of the liquid crystal molecules according to the present invention.

The LC lens unit 120 as shown in FIG. 3 can be applied in a 2D mode. FIG. 4 shows a schematic diagram showing a cross section of the LC lens unit 120 in the 2D mode and the alignment of the liquid crystal molecules according to the present invention. Take the LC lens unit 120 in the 2D mode for example. The liquid crystal molecules in the liquid crystal layer 122 will rotate because of a newly generated electric field when voltage applied on the electrodes 123a, 123b, and 123c is altered (for example, no voltage is applied). The optical axis of the liquid crystal molecules of the electrodes 123a, 123b, and 123c is in parallel with the polarization direction of the incident light, which is equivalent to no lenses existing. Therefore, any light traveling through the liquid crystal layer 122 has the same polarization direction. Since light travels in a linear manner, the viewer will watch 2D images.

Please refer to FIG. 3 and FIG. 4. The liquid crystal molecules in the liquid crystal layer 122 are positive. So, the alignment of the liquid crystal molecules is in parallel with the generated electric field when voltage is applied on the electrodes 123. In another embodiment, the liquid crystal molecules in the liquid crystal layer 122 can be negative. In the embodiment where the liquid crystal molecules are negative, both of the alignment and the extending direction of the electrodes 123 have to be altered to fit an appropriate design.

Please refer to FIG. 2 and FIG. 5. FIG. 5 shows the polarization direction of the polarizer film 126, the polarization direction of the retard unit 124, and a second direction D of the electrode layer 123. As mentioned above, the LC lens unit 120 also comprises the retard unit 124. The polarization direction of the incident light to the LC lens unit 120 does not match the alignment of the LC lens unit 120, which causes a loss of the lens power of the LC lens unit 120. Owing to the retard unit 124, the lens power of the LC lens unit 120 is saved. The polarization direction of the light from the retard unit 124 is coincident with the third direction C. The third direction C is perpendicular to the second direction D of the electrode layer 123. Before voltage is applied, the optical axis of the liquid crystal molecules of the electrode layer 123 is in parallel with the third direction C; that is, the optical axis of the liquid crystal molecules of the electrode layer 123 matches the third direction C. By contrast, for the LC lens unit 120 without the retard unit 124, the polarization direction of the incident light to the polarizer film 126 is coincident with the first direction B. Before voltage is applied, the optical axis of the liquid crystal molecules of the electrode layer 123 is not in parallel with the first direction B; that is, the optical axis of the liquid crystal molecules of the electrode layer 123 does match the first direction B. Compared with the LC lens unit 120 without the retard unit 124, the LC lens unit 120 comprising the retard unit 124 still has the highest lens power even though thickness of the LC lens unit 120 is not increased.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A stereoscopic display, comprising:
    a backlight module, for generating light;
    a polarizer film, disposed on the backlight module, for converting polarized light from the backlight module into light along a first direction;
    a transparent substrate, disposed on the polarizer film, a plurality of electrodes being disposed on the transparent substrate, each of the plurality of electrodes extending along a second direction, the second direction being different from the first direction; and
    a liquid crystal layer, disposed on the transparent substrate, an alignment of liquid crystal molecules in the liquid crystal layer varying according to voltage applied on the plurality of electrodes; and
    a retard unit, disposed between the transparent substrate and the polarizer film, for converting the polarized light from the polarizer film into light along a third direction, the third direction being different from the first direction and the second direction;
    wherein the plurality of electrodes comprise a first electrode, a second electrode, and a third electrode, the second electrode is disposed between the first electrode and the third electrode, and the stereoscopic display shows 3D images when an optical axis of the liquid crystal molecules near the first electrode and the third electrode is in parallel with a direction of transmission of the light from the polarizer film and when the optical axis of the liquid crystal molecules near the second electrode is in parallel with a polarization direction of the light from the polarizer film.

2. The stereoscopic display as claimed in claim 1, wherein the third direction is perpendicular to the second direction.

3. The stereoscopic display as claimed in claim 2, wherein the retard unit is a half-wave retardation plate.

4. The stereoscopic display as claimed in claim 1, wherein the stereoscopic display shows 2D images when the optical axis of the liquid crystal molecules near the first electrode, the second electrode, and the third electrode is in parallel with the polarization direction of the light from the polarizer film.

5. A liquid crystal lens unit, comprising:
    a polarizer film, for converting polarized light into light along a first direction;
    a transparent substrate, disposed on the polarizer film, a plurality of electrodes being disposed on the transparent substrate, each of the plurality of electrodes extending along a second direction, the second direction being different from the first direction; and
    a liquid crystal layer, disposed on the transparent substrate, an alignment of liquid crystal molecules in the liquid crystal layer varying according to voltage applied on the plurality of electrodes; and
    a retard unit, disposed between the transparent substrate and the polarizer film, for converting the polarized light into light along a third direction, the third direction being different from the first direction and the second direction;
    wherein the plurality of electrodes comprise a first electrode, a second electrode, and a third electrode, the second electrode is disposed between the first electrode and the third electrode, and the stereoscopic display shows 3D images when an optical axis of the liquid crystal molecules near the first electrode and the third electrode is in parallel with a direction of transmission of the light from the polarizer film and when the optical axis of the liquid crystal molecules near the second electrode is in parallel with a polarization direction of the light from the polarizer film.

6. The liquid crystal lens unit as claimed in claim 5, wherein the third direction is perpendicular to the second direction.

7. The liquid crystal lens unit as claimed in claim 6, wherein the retard unit is a half-wave retardation plate.

8. The liquid crystal lens unit as claimed in claim 5, wherein the stereoscopic display shows 2D images when the optical axis of the liquid crystal molecules near the first electrode, the second electrode, and the third electrode is in parallel with the polarization direction of the light from the polarizer film.

* * * * *